United States Patent
Koo

(10) Patent No.: US 7,447,804 B2
(45) Date of Patent: Nov. 4, 2008

(54) SYSTEM AND METHOD FOR MULTI-TELECOMMUNICATION OVER LOCAL IP NETWORK

(75) Inventor: Chan-Kyu Koo, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 242 days.

(21) Appl. No.: 09/805,362

(22) Filed: Mar. 14, 2001

(65) Prior Publication Data

US 2001/0032270 A1    Oct. 18, 2001

(30) Foreign Application Priority Data

Mar. 20, 2000    (KR)    .......................... 10-2000-14102

(51) Int. Cl.
G06F 15/16    (2006.01)
H04L 12/56    (2006.01)
G06F 15/173   (2006.01)

(52) U.S. Cl. .................. 709/249; 709/227; 709/238; 709/246; 370/400

(58) Field of Classification Search ................ 709/249; 370/214
See application file for complete search history.

(56) References Cited

U.S. PATENT DOCUMENTS 5,689,642 A * 11/1997 Harkins et al. ............... 709/229
5,719,942 A *  2/1998 Aldred et al. ................ 709/228
5,793,763 A *  8/1998 Mayes et al. ................ 370/389
5,841,976 A * 11/1998 Tai et al. ..................... 709/227
5,854,893 A * 12/1998 Ludwig et al. ............... 709/227
6,201,805 B1 *  3/2001 Strathmeyer ................ 370/356
6,229,804 B1 *  5/2001 Mortsolf et al. ............. 709/244

(Continued)

FOREIGN PATENT DOCUMENTS

JP    10-154995    6/1998

(Continued)

OTHER PUBLICATIONS

Greenstein, Larry. "Transporting Voice Traffic Over Packet Networks." International Journal of Network Management. vol. 8, Issue 4, pp. 227-234. Jul.-Aug. 1998. John Wiley & Sons, Inc.*

(Continued)

Primary Examiner—Jason Cardone
Assistant Examiner—Jeffrey R Swearingen
(74) Attorney, Agent, or Firm—Sughrue Mion, PLLC

(57) ABSTRACT

A system and method for multi-telecommunication over a local IP network are provided. The multi-telecommunication system includes an IP network, a local IP network, a plurality of terminals connected to the local IP network, for conducting a voice call or a video call over the local IP network, a home gateway connected to the IP network and the local IP network, for interfacing between the IP network and the plurality of terminals, assigning an ID and a port to each terminal to differentiate terminals sharing one IP address in processing an incoming call and an outgoing call, and converting IP and port information in the header and payload of a received or transmitted packet according to an assigned ID and port number, and a gatekeeper connected to the IP network, for performing registration and call connection admission and managing the state of the IP network.

55 Claims, 12 Drawing Sheets

U.S. PATENT DOCUMENTS

| | | | |
|---|---|---|---|
| 6,233,234 B1 * | 5/2001 | Curry et al. | 370/356 |
| 6,373,857 B1 * | 4/2002 | Ma | 370/475 |
| 6,374,302 B1 * | 4/2002 | Galasso et al. | 709/238 |
| 6,480,588 B1 * | 11/2002 | Donovan | 379/114.2 |
| 6,519,249 B1 * | 2/2003 | Bennefeld et al. | 370/352 |
| 6,563,824 B1 * | 5/2003 | Bhatia et al. | 370/392 |
| 6,731,642 B1 * | 5/2004 | Borella et al. | 370/401 |
| 6,785,223 B1 * | 8/2004 | Korpi et al. | 370/218 |

FOREIGN PATENT DOCUMENTS

| | | |
|---|---|---|
| JP | 11-122285 | 4/1999 |
| JP | 11-50566 | 6/1999 |
| JP | 11-508753 | 7/1999 |
| KR | 1998-087305 A | 12/1998 |
| WO | WO 97/40610 A2 | 10/1997 |
| WO | WO 00/08803 A1 | 2/2000 |

OTHER PUBLICATIONS

Stevens, W. Richard. TCP/IP Illustrated, vol. 1. 17.3 TCP Header. pp. 225-226. Addison-Wesley, 1994.*

Morgan, David. "Workings of a Virtual Private Network, Part 1." Linux Journal. vol. 1999 Issue 68es. Dec. 1999.*

Blank M: "H. 323 Gatekeepers: Essential Software for IP Telephony and Multimedia Conferencing" CTI Developer, 'Online!, Feb. 1998, XP002196210.

Sengodan S: "A Gatekeeper Discovery Mechanism for H.323 Systems", Proceedings of the SPIE, SPIE, Bellignham, VA, US, vol. 3528, Nov. 2, 1998, pp. 319-326, XP009013925.

Matt Holdrege, "Protocol Complications with the IP Network Address Transfer (NAT)", draft-ietf-nat-protocol-complications-01, txt, NAT Working Group, Jun. 1999.

Melinda Shore, "H.323 and Firewalls: Problem Statement and Solution Framework", draft-shore-h323-firewalls-00.txt, Feb. 3, 2000.

Tetsuo Nozawa, Obstacles to IP integration of voice: a radical VoIP solution not relying on address conversion to come in 2000 or later. Nikkei Communications, No. 301, Nikkei Communications, Japan, Nikkei BP Sha, Nikkei Business Publications, Inc., Sep. 6, 1999, pp. 73-75.

* cited by examiner

SYSTEM AND METHOD FOR MULTI-TELECOMMUNICATION OVER LOCAL IP NETWORK

BACKGROUND OF THE INVENTION

1. Field of the Invention

The present invention relates generally to telephony over a local IP (Internet Protocol) network, and in particular, to a system and method for conducting a telephone call for a plurality of users over a local IP network to which a single IP address is assigned. The present application is based on Korean Patent Application No. 14102/2000 filed on Mar. 20, 2000, which is incorporated herein by reference.

2. Description of the Related Art

FIG. 1 is a block diagram of a conventional system for telephony over an IP network, FIG. 2 illustrates protocols for telephony in a terminal of the conventional system, FIG. 3 is a signal flow diagram for discovering a gatekeeper in the conventional system, and FIG. 4 is a signal flow diagram for a call process in the conventional system.

Referring to FIG. 1, a VOIP (Voice Over Internet Protocol)-based telephone call is conducted over an IP network 110 according to the ITU-T (International Telecommunication Union-Telecommunication Sector) Recommendation H.323.

A gatekeeper 120 acts as a server for conversion between a telephone number input by an end user and an IP address, and provides registration, authentication, and RAS (Registration Admission Status) management. Computers 150 and 151 are assigned to unique IP addresses and connected to the IP network 110. The IP network 110 is connected to the PSTN (Public Switched Telecommunication Network) 180 and 181 via gateways 190 and 191, respectively. An I-PHONE 160 is an Internet phone for an Internet call.

H.323 provides protocols as shown in FIG. 2. According to H.323, a communication is conducted by TCP (Transmission Control Protocol) 210 or UDP (User Data Protocol) 220 based on IP (Internet Protocol) 200.

To attempt connection of an initial call, call signaling is performed according to H.225 (Q.931) 211, call control according to H.245 212, and data transmission according to T.120 213. H.225, H.245, and T.120 are based on TCP 210.

After call connection, G.7XX 221 controls voice transmission and H.26X 222 controls video transmission. G.7XX and H.26X are processed by RTP (Real Time Protocol) 223 for real-time transmission, and RTCP (real-time transport control protocol) 224 controls an RTP channel. G.7XX, H.26X, RTP, and RTCP are based on UDP 220. TCP requests an acknowledgment and UDP transmits data regardless of the acknowledgment. UDP 220 processes voice or video data because its slight loss is negligible to a user in data recovery.

Referring to FIG. 3, a description will be made of an operation of discovering the gatekeeper 120 for a telephone call over the IP network 110 in the computer 150.

In step 300, the computer 150 transmits a gatekeeper request message GRQ using a multicast address by UDP in order to discover the gatekeeper 120. The gatekeeper 120 transmits a gatekeeper confirm message GCF to the computer 150 as a response to the gatekeeper request message GRQ in step 310. The gatekeeper confirm message, GCF contains the IP address of the gatekeeper 120. Upon receipt of the gatekeeper confirm message GCF, the computer 150 transmits a registration request message RRQ to the gatekeeper 120, thereby registering a Q.931 transport address (IP address+TCP port number) and an alias address of the computer 150 and the IP address of a destination (i.e., a receiving computer). The alias address is registered when a local IP network is assigned to a plurality of IP addresses. Such a local IP network dynamically allocates the IP addresses to computers connected to the local IP network upon request of Internet access and a gatekeeper registers the IP addresses assigned to the computers.

When registration is completed, the gatekeeper 120 transmits a registration confirm message RCF to the computer 150 in step 330. For this purpose, the ITU-T defines UDP and TCP channels as shown in Table 1 below.

TABLE 1

| | |
|---|---|
| GATEKEEPER DISCOVERY MULTICAST ADDRESS | 224.0.1.41 |
| GATEKEEPER UDP DISCOVERY PORT | 1718 |
| GATEKEEPER UDP REGISTRATION AND STATUS PORT | 1719 |
| ENDPOINT TCP CALL SIGNALLING PORT (in the case of direct call signaling to an endpoint without a gatekeeper) | 1720 |

A procedure subsequent to the registration will be described with reference to FIG. 4.

Referring to FIG. 4, the computer 150 transmits an admission request message ARQ to the gatekeeper 120 in step 400 and the gatekeeper 120 transmits an admission confirm message ACF to the computer 150 in response to the admission request message ARQ as long as the receiving computer is not busy. Then, the computer 150 opens a TCP channel for call signaling according to Q.931 in step 420 and transmits its transport address to the computer 151, thereby requesting connection in step 430. The computer 151 transmits the admission request message ARQ to the gatekeeper 120 in order to request a connection admission. In step 450, the gatekeeper 120 transmits the admission confirm message ACF to the computer 151. After the call connection is admitted, the computer 150 transmits an H.245 transport address to the computer 151, thereby notifying completed connection in step 460. The computer 150 opens a TCP channel for H.245 in step 470 and establishes an RTP/RTCP channel for a voice or video call in real time by exchanging H.245 messages in step 480. Then, the call progresses by UDP in step 490.

The above call process has been described in the context of the ITU-T recommendations and its detailed description is omitted here.

Telephony over the IP network is viable on the premise that each terminal (computer, Internet phone, etc.) is assigned to a unique IP address. In other words, a terminal connected to a local IP network and having no unique IP address cannot receive/transmit data. When a telephone call is conducted over the IP network, each IP address functions as a telephone number. Therefore, a computer without an IP address cannot conduct a telephone call.

SUMMARY OF THE INVENTION

It is, therefore, an object of the present invention to provide a system and method for conducting a telephone call using a single IP address in a plurality of terminals connected to a local IP network.

It is another object of the present invention to provide a system and method for interfacing between a terminal connected to an IP network and a terminal connected to a local IP network when a plurality of terminals connected to the local IP network conduct telephone calls using a single IP address.

To achieve the above and other objects, there is provided a system and method for multi-telecommunication over a local IP network. The multi-telecommunication system includes an IP network, a local IP network, a plurality of terminals connected to the local IP network, for conducting a voice call or a video call over the local IP network, a home gateway connected to the IP network and the local IP network, for interfacing between the IP network and the plurality of terminals, assigning an ID and a port to each terminal to differentiate terminals sharing one IP address in processing an incoming call and an outgoing call, and converting IP and port information in the header and payload of a received or transmitted packet according to an assigned ID and port number, and a gatekeeper connected to the IP network, for performing registration and call connection admission and managing the state of the IP network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
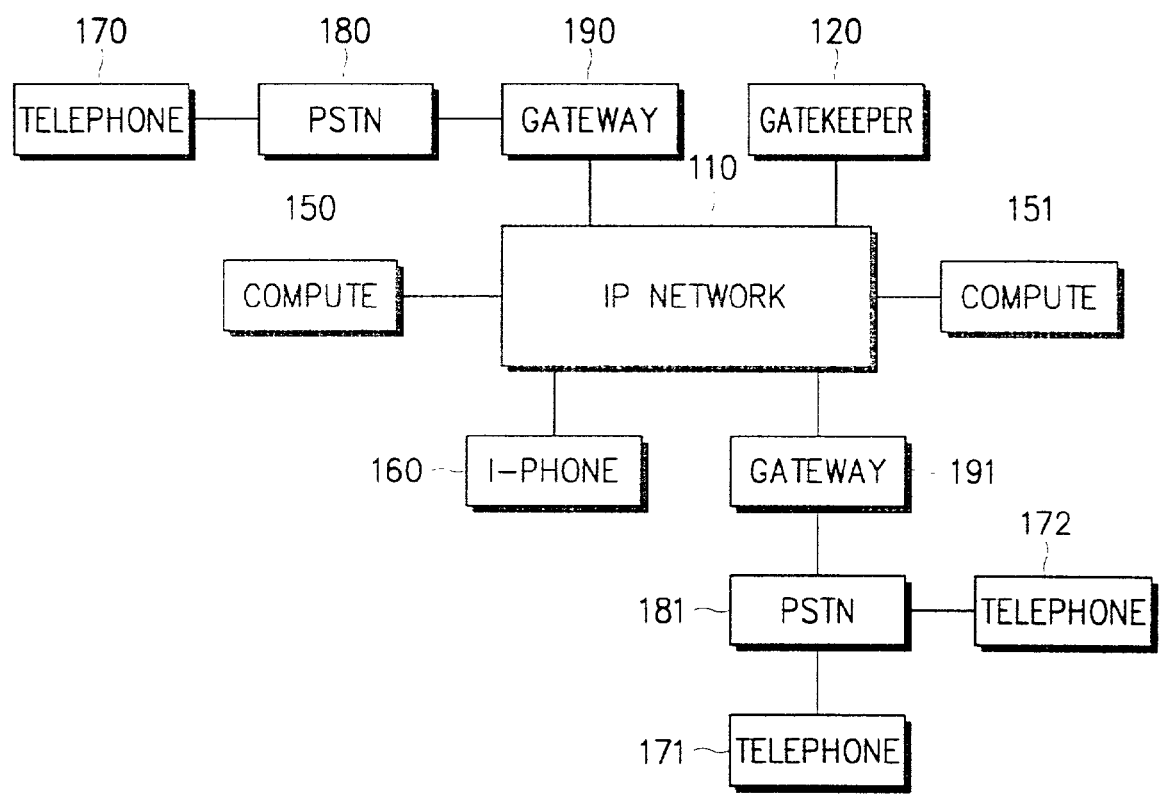
FIG. 1 is a block diagram of a conventional system for conducting a VOIP-based telephone call.
Figure 2:
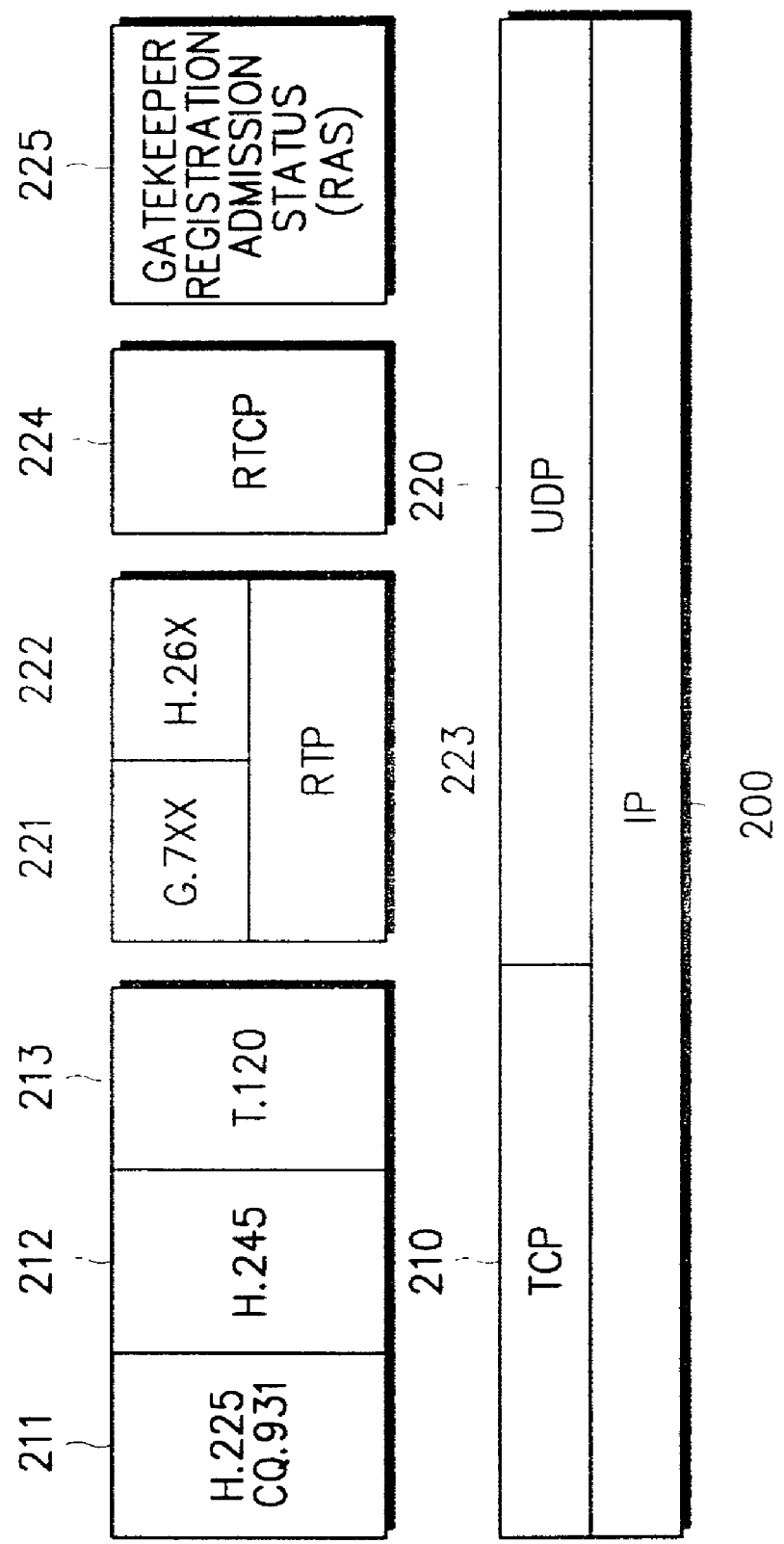
FIG. 2 illustrates the structure of protocols for a telephone call in a terminal of the conventional system.
Figure 3:
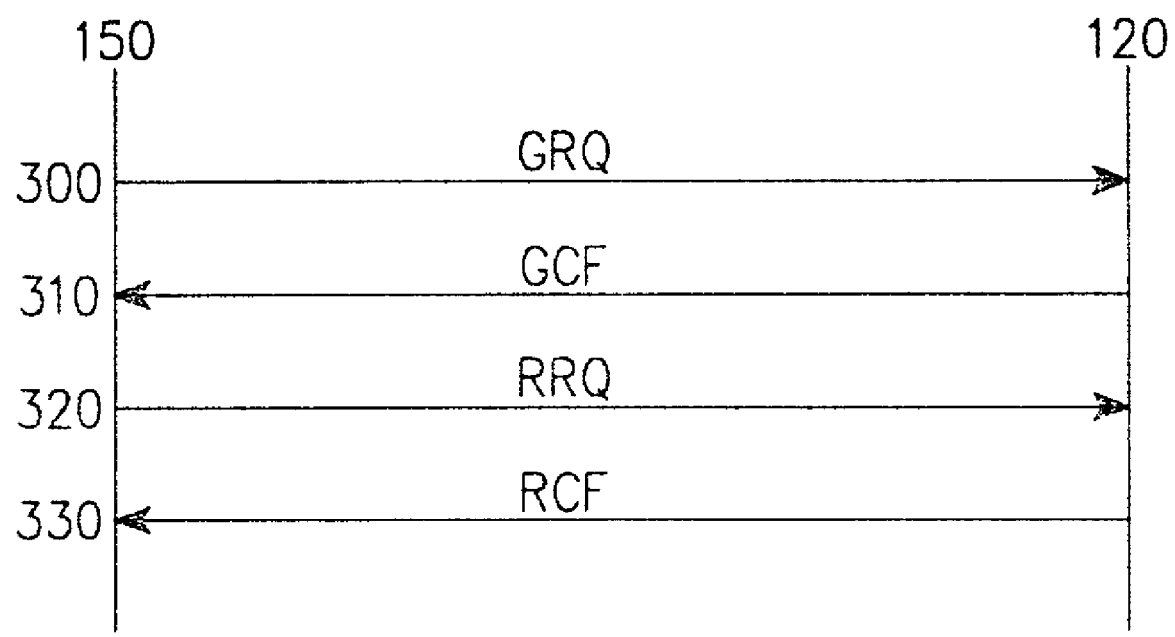
FIG. 3 is a signal flow diagram for discovering a gatekeeper in the conventional system.
Figure 4:
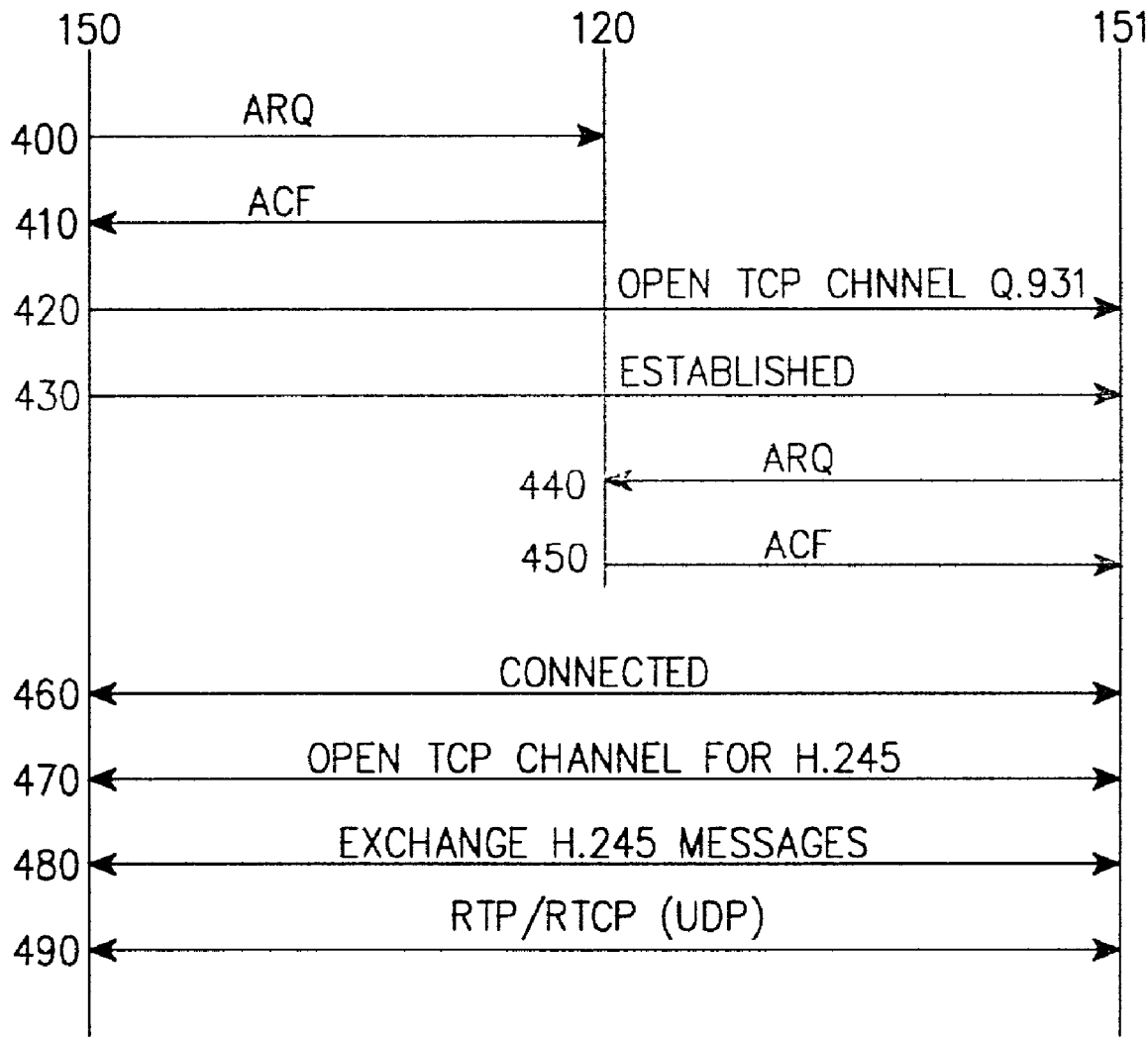
FIG. 4 is a signal flow diagram for a telephone call process in the conventional system.
Figure 5:
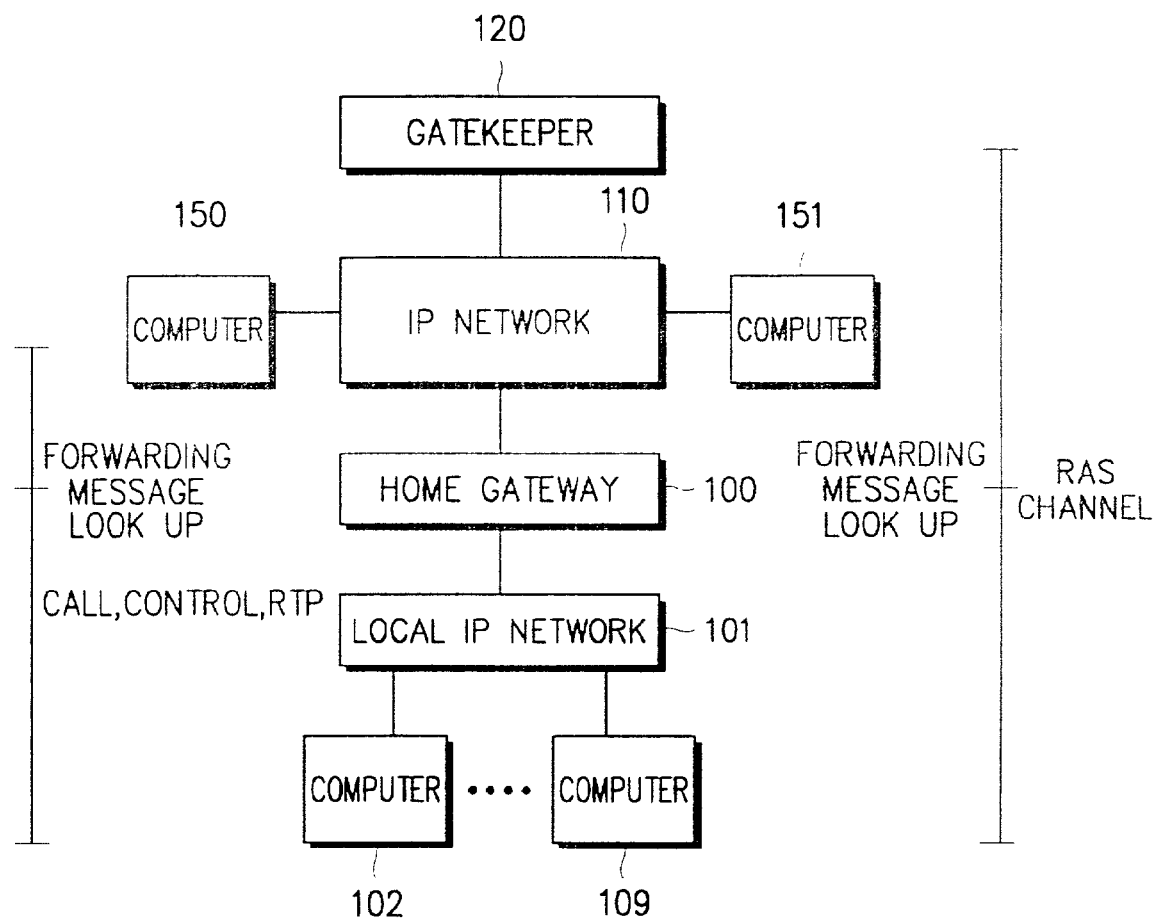
FIG. 5 illustrates a multi-telecommunication system according to an embodiment of the present invention.
Figure 6:
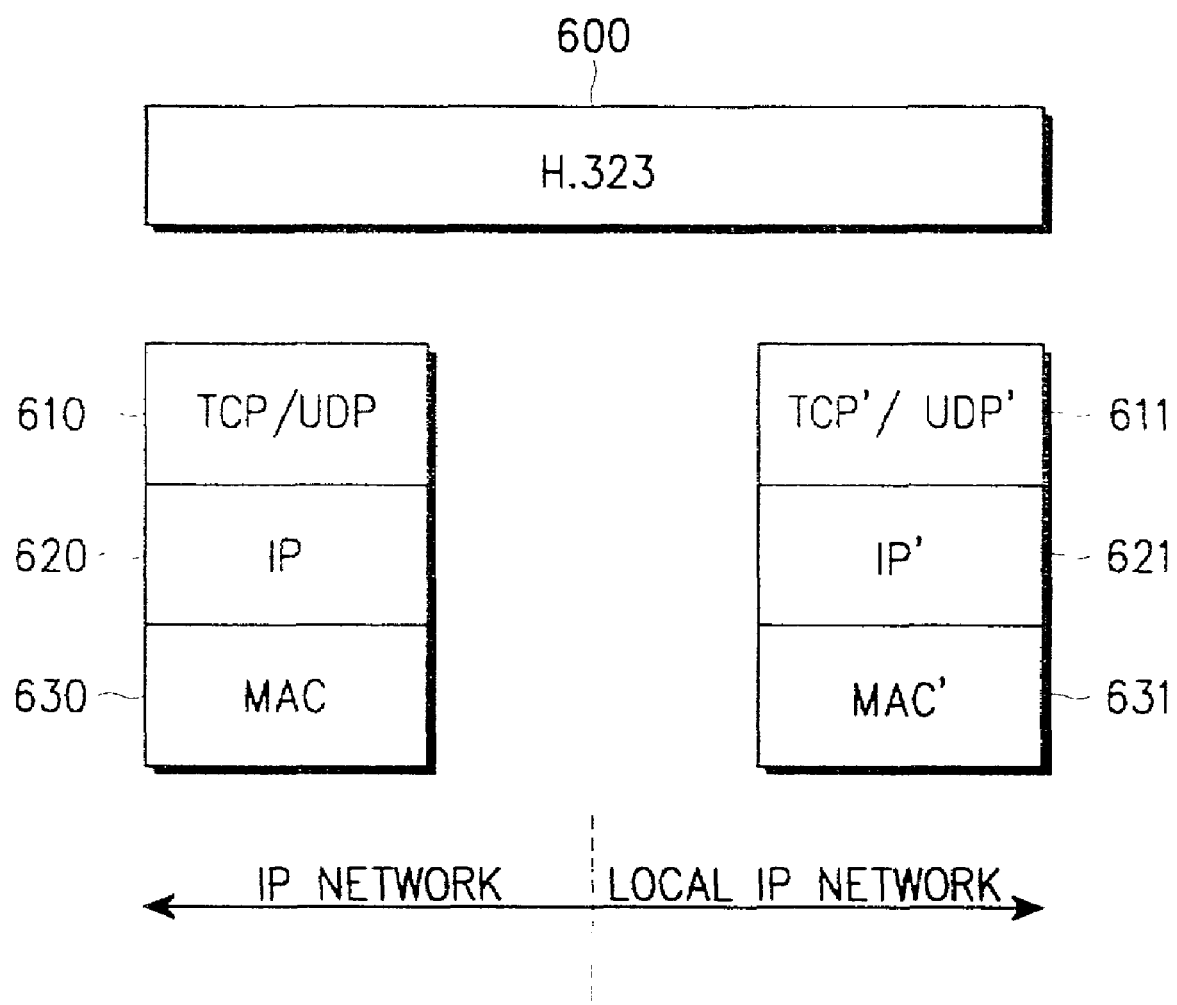
FIG. 6 illustrates the structure of protocols for a home gateway according to the embodiment of the present invention.

Referring to FIGS. 5 and 6, a multi-telecommunication system according to an embodiment of the present invention will be described. In FIG. 5, a home gateway 100, which controls a plurality of computers 102 to 109 via a local IP network 101, executes a different function from that of a conventional home gateway as shown in FIG. 1. Only protocol conversion is executed in the conventional home gateway to interface between the IP network 110 and the computers 150 and 151. That is, externally input packets of TCP/UDP 610, IP 620, and MAC (medium access control) 630 are converted to packets of TCP'/UDP' 611, IP' 621, and MAC'631 for connection to the local IP network 110. However, the home gateway 100 additionally provides packet conversion according to the ITU-T Recommendation H.323. Therefore, the home gateway 100 converts both the header and payload of a packet by referring to a predetermined table.

The local IP network 101 is usually assigned to less IP addresses in number than the computers 102 to 109 on the assumption that all the computers 102 to 109 are not connected to the IP network 110. Hence, the home gateway dynamically assigns the IP addresses to computers that request access to the IP network, which implies that a different IP address is assigned to a computer depending on the situation. Consequently, the computers 102 to 109, dynamically assigned to IP addresses, cannot access the IP network for call connection. To overcome the problem, the home gateway 100 differentiates computers that share an identical IP address by port numbers in order to conduct a telephone call over the IP network 110 in the present invention.

In general, an IP address in an IP network serves as a telephone number to identify an end user. However, an IP address assigned to the local IP network 101 acts as a local number and a port number, as well as a telephone number. Table 2 below shows how the home gateway 100 identifies the computers 102 to 109 connected to the local IP network 101. The home gateway 100 can, for example, include a memory for storing the Ids, and port numbers.

TABLE 2

| Terminal | Assigned IP Address | Internal IP Address | Assigned port Number |
|---|---|---|---|
| Terminal #1 | 203.234.47.18 | 10.0.0.0 | 6 |
| Terminal #2 | 203.234.47.18 | 10.0.0.1 | 7 |
| Terminal #3 | 203.234.47.18 | 10.0.0.2 | 8 |
| . | 203.234.47.18 | . | . |
| . |  | . | . |
| . |  | . | . |
| Terminal #9 | 203.234.47.18 | 10.0.0.8 | 11 |
| Terminal #10 | 203.234.47.19 | 10.0.255.1 | 6 |
| Terminal #11 | 203.234.47.19 | 10.0.255.2 | 7 |
| Terminal #12 | 203.234.47.19 | 10.0.255.3 | 8 |
| . | 203.234.47.19 | . | . |
| . |  | . | . |
| . |  | . | . |
| Terminal #N | 203.234.47.19 | 10.0.255.255 | P |

As shown in Table 2, the local IP network 101 connected to the IP network 110 has N terminals and is assigned to two IP addresses, 203.234.47.18 and 203.234.47.19. Each IP address is shared by a plurality of terminals. The local IP network 101 identifies each terminal by an internal IP address, that is, 10.0.0.0 to 10.0.255.255. According to the embodiment of the present invention, each terminal is assigned to a different port number to make a distinction between the terminals of the local IP network 101. Here, a port refers to a TCP/UDP port, not in a physical or hardware sense. In general, an IP network assigns particular ports to process HTTP, E-mail, and FTP and has a plurality of reserved ports. These reserved ports are used as IDs to identify the terminals connected to the local IP network 101 in the embodiment of the present invention. By the port numbers, the IP network 110 and the computers 150 and 151 connected to the IP network 110 identify the computers 102 to 109 connected to the local IP network 101. The ports may be assigned by a network operator. Information about assigned ports and IP addresses are stored in a memory for use in packet conversion. Assigned and updated port numbers and IP addresses are transmitted to and registered in the gatekeeper 120 that manages the IP network 110.

A packet is typically divided into a header indicating a destination and a source and a payload containing real user data. When H.323 is used for a voice call or a video call, the IP, TCP, and UDP information of a destination is included in the payload as well as in the header of a packet. Therefore, when only the header is changed, a terminal just notifies the presence of an error by an error check on the payload, and does not conduct a call. The home gateway 100 changes the information of the header and payload according to predetermined values (Table 2), to thereby conduct a telephone call.

Now, call initiation and call termination will be described.

Figure 7:
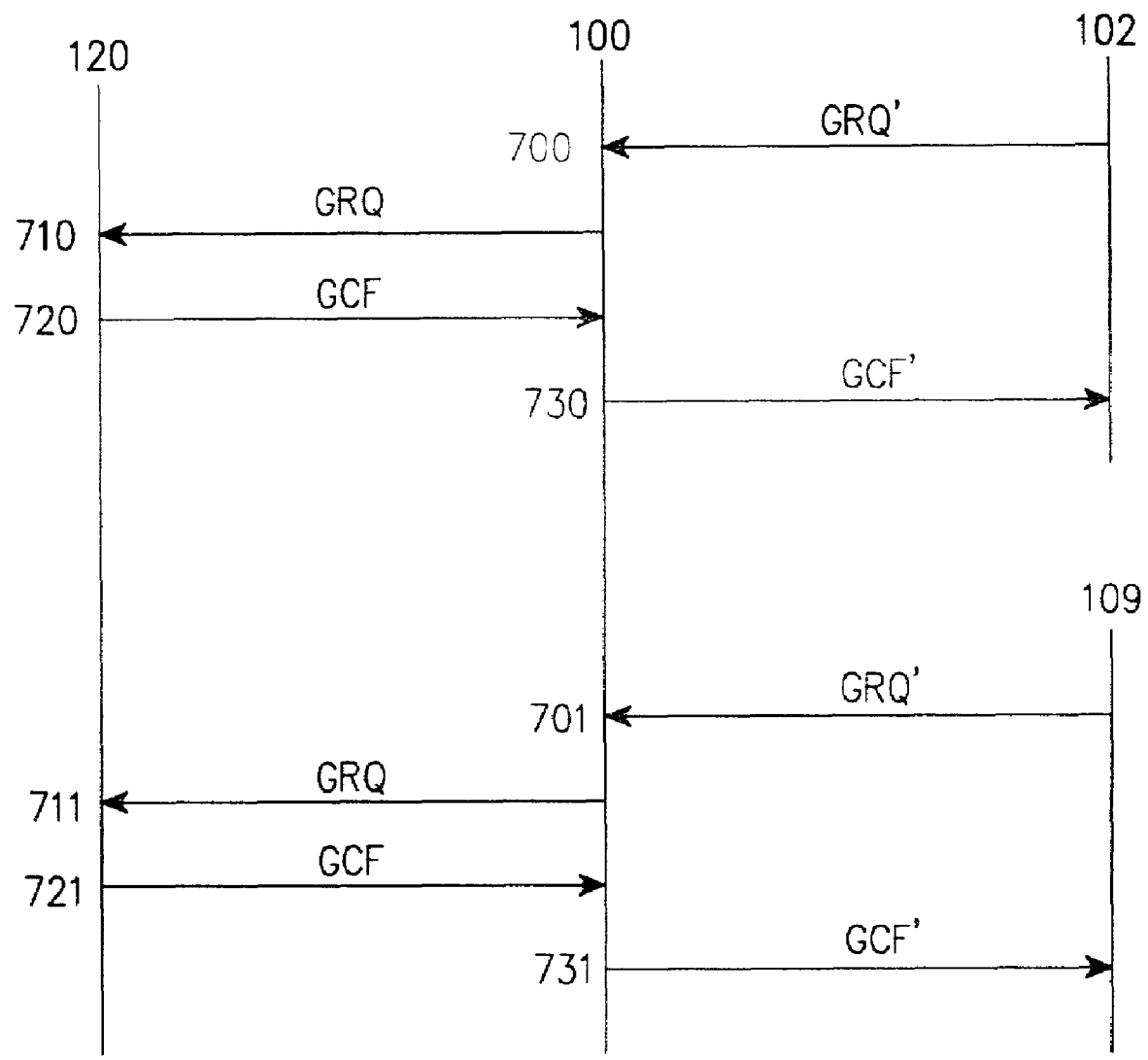
FIG. 7 is a signal flow diagram for discovering a gatekeeper according to the embodiment of the present invention.

FIG. 7 is a signal flow diagram for discovering the gatekeeper 120. Referring to FIG. 7, the home gateway 100 operates to discover the gatekeeper 120 of the IP network 110 in step 700. This step is performed in a similar manner to the conventional method.

In step 700, the computer 102 connected to the local IP network 101 transmits a gatekeeper request message GRQ' to the home gateway 100. The home gateway 100 converts a GRQ' packet to a GRQ packet referring to Table 2 and transmits the GRQ packet to the IP network 110 in step 710. The packet conversion represents changing the contents of the header and payload of the GRQ' packet. "'" of GRQ' indicates a packet generated in the local IP network 101 or a packet directed to a terminal connected to the local IP network 101.

The packet conversion will be described with an example taken. The computer 102 transmits a packet for a telephone call to the home gateway 100. The header of the packet includes a multicast IP address to discover the gatekeeper 120 and an internal IP address assigned to the computer 102 by the local IP network 101. Then, the home gateway 100 changes the internal IP address to an IP address assigned to the local IP network 101 by the IP network 110 and writes a port number assigned for a telephone call in the payload as well as in the header of the packet, and transmits the converted packet to the IP network 110.

Upon receipt of the gatekeeper request message GRQ from the IP network 110, the IP network 110 transmits the gatekeeper confirm message GCF, including the IP address of the gatekeeper 120, to the home gateway 100 in step 720. The message GCF is transmitted to a corresponding IP address and port number according to the information of the GRQ packet. If H.323 is used, information in the payload of the GCF packet is also determined according to the received GRQ packet. Upon receipt of the gatekeeper confirm message GCF, the home gateway 100 checks whether there is a terminal with the corresponding IP address and port number referring to Table 2. If the terminal exists, the home gateway 100 detects an internal IP address assigned to the port, converts the IP and port information of the header and payload in the GCF packet, and transmits the converted GCF' packet to the computer 102 in step 730.

In steps 701, 711, 721, and 731, another computer 109 searches for the gatekeeper 120. Their description will be omitted herein. As shown in Table 2, terminals connected to the local IP network are differentiated by different ports though they use the same IP address assigned to the local IP network. The ports are TCP/UDP ports as shown in FIG. 6 and different or the same ports may be used for TCP and UDP as shown in Table 2. In the embodiment of the present invention, terminals in the local IP network share the same IP address to emphasize that they are differentiated by ports when they communicate with the IP network.

Figure 8:
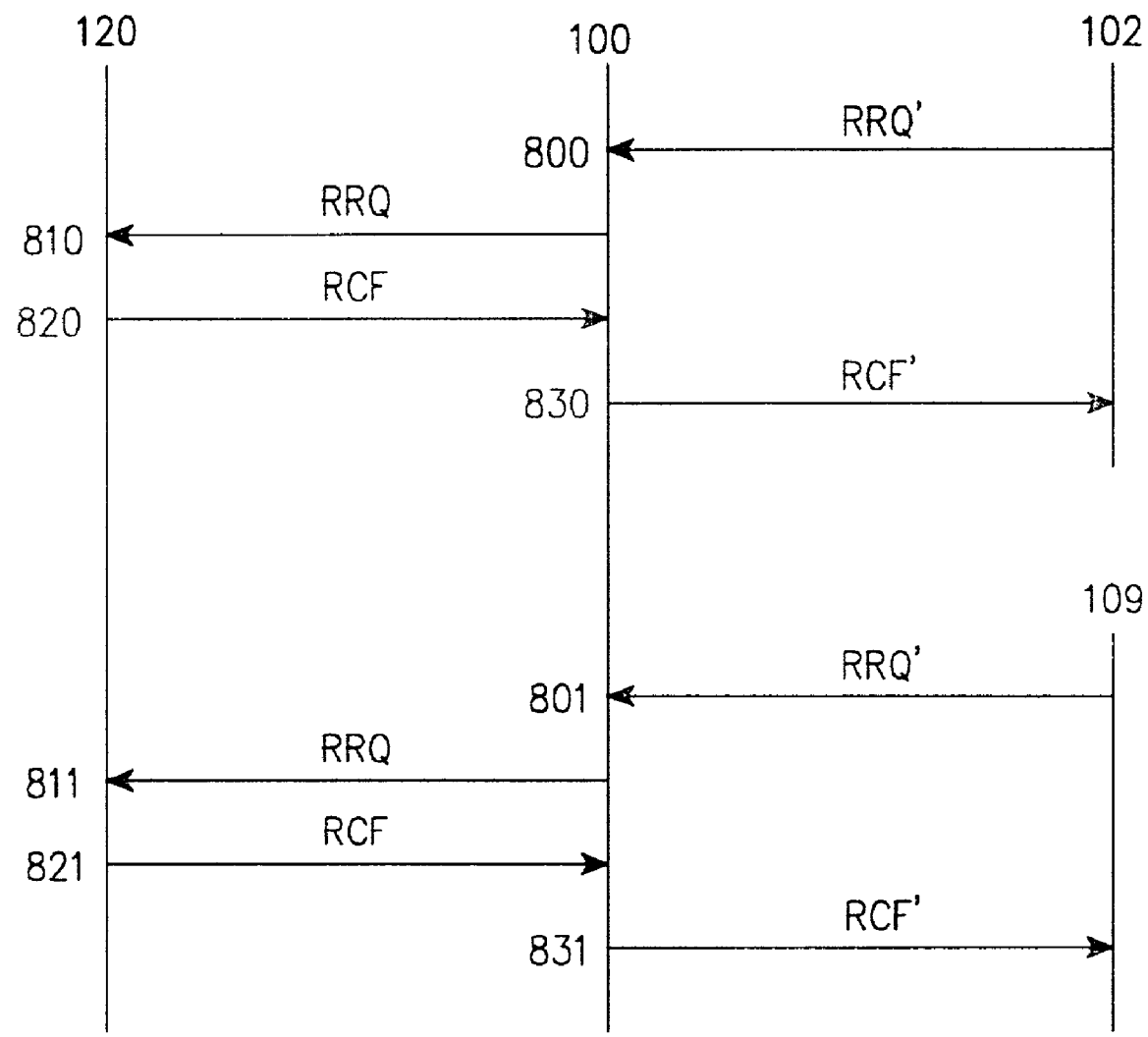
FIG. 8 is a signal flow diagram for registration in the gatekeeper according to the embodiment of the present invention.

FIG. 8 is a signal flow diagram for registering the computer 102 that requests a call in the gatekeeper 120. In step 800, the computer 102 transmits a registration request message RRQ' to the home gateway 100 to request a telephone call to the gatekeeper 120. The home gateway 100 converts the RRQ' packet to an RRQ packet referring to Table 2 and transmits the RRQ packet to the gatekeeper 120 in step 810. As stated above, the conversion is performed on the contents of the header and payload of the RRQ' packet. "'" of RRQ' indicates that the packet is generated in the local IP network 101 or that the packet is directed to a terminal connected to the local IP network 101.

The packet conversion will be described with an example taken. The computer 102 transmits a packet for registration to the home gateway 100. The header of the packet includes the IP address of the gatekeeper 120 and an internal IP address of the computer 102 assigned by the local IP network 101. Then, the home gateway 100 changes the internal IP address to an IP address assigned to the local IP network 101 by the IP network 110 and writes a port number assigned for a telephone call in the payload as well as in the header of the packet, and transmits the converted packet to the gatekeeper 120.

Upon receipt of the gatekeeper request message RRQ, the gatekeeper 120 transmits the registration confirm message RCF to the home gateway 100 in step 820. The message RCF is transmitted to a corresponding IP address and port number according to the information of the RRQ packet. If H.323 is used, the information of the payload of the RCF packet is also determined according to the received RRQ packet. Upon receipt of the registration confirm message RCF, the home gateway 100 checks whether there is a terminal with the corresponding IP address and port number referring to Table 2. If the terminal exists, the home gateway 100 detects an internal IP address assigned to the port, converts the IP and port information of the header and payload in the RCF packet, and transmits the converted RCF' packet to the computer 102 in step 830.

In steps 801, 811, 821, and 831, another computer 109 is registered in the gatekeeper 120. Their description will be omitted herein.

Figure 9:
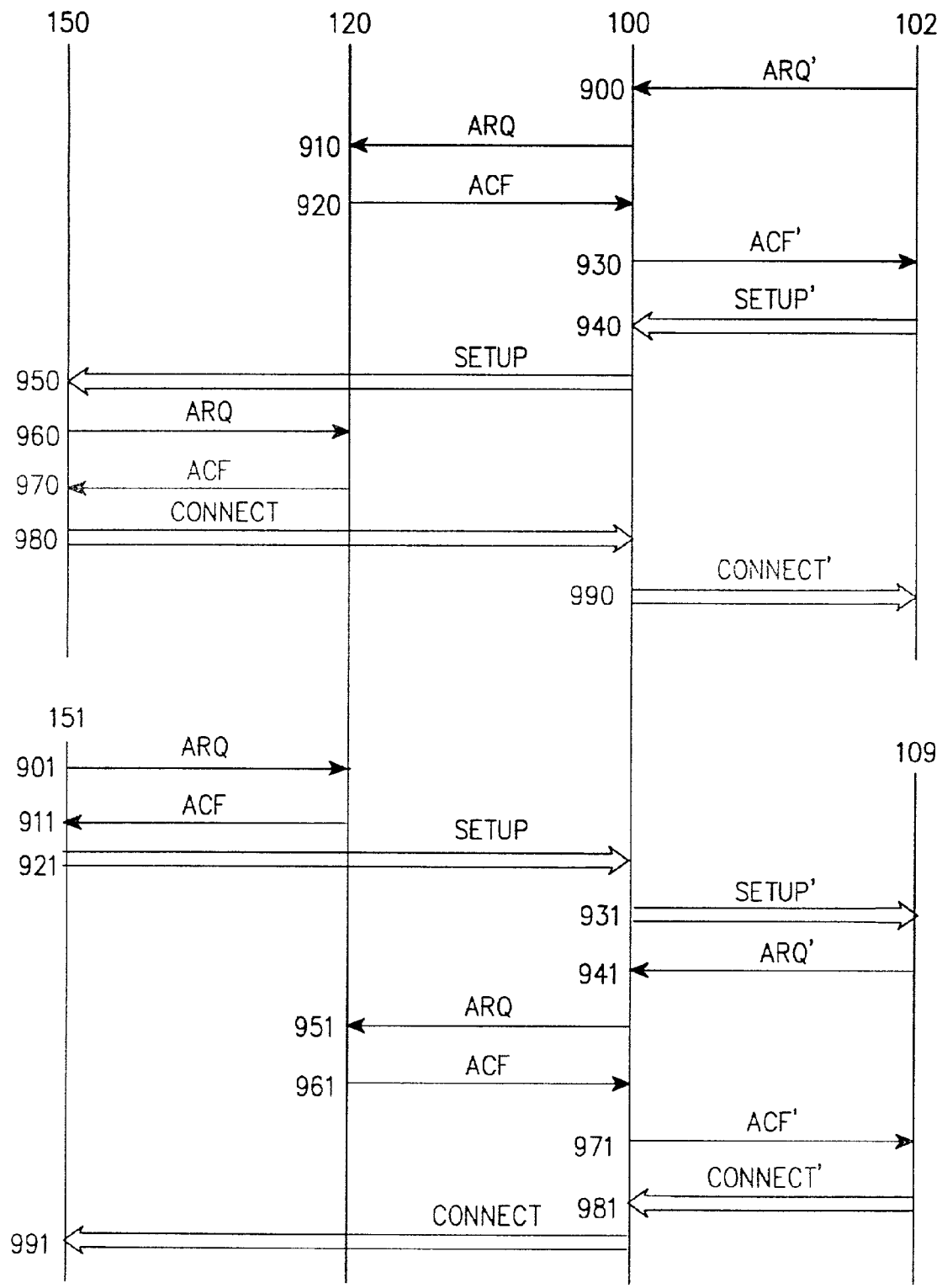
FIG. 9 is a signal flow diagram for a telephone call process according to the embodiment of the present invention.

FIG. 9 is a signal flow diagram for a post-registration procedure. In step 900, the computer 102 transmits an admission request message ARQ', including the IP and port information of a destination, to the home gateway 100. The home gateway 100 converts the ARQ' packet to an ARQ packet referring to Table 2 and transmits the ARQ packet to the gatekeeper 120 in step 910. The gatekeeper 120 detects the IP address and port number of the destination from the received ARQ packet and checks whether the destination terminal is communicable with the computer 102. If the terminal is communicable, the gatekeeper 120 transmits an admission confirm message ACF to the home gateway 100 in step 920.

Packets exchanged in the procedures of FIGS. 7 and 8 and in steps 900, 910, 920, and 930 in FIG. 9 use channels that have been established for communication with the gatekeeper 120.

After the computer 102 gains admission, it transmits a message SETUP', including the IP address and port of the computer 102, to the home gateway 100 in step 940. The home gateway 100 converts the SETUP' packet to a SETUP packet and transmits the SETUP packet to the receiving computer 150 in step 950. The computer 150 gains a connection admission from the gatekeeper 120 in steps 960 and 970 and transmits a message CONNECT including the IP address and port number of the computer 150 to the home gateway 100 in step 980. The home gateway 100 converts the CONNECT packet to a CONNECT' packet and transmits the CONNECT' packet to the computer 102 in step 990.

Steps 901, 911, 921, . . . , and 991 are the same as the above procedure except that a call is terminated in a computer connected to the local IP network. Thus, their description is omitted.

In FIG. 9, messages indicated by single-line arrows are transmitted on channels established for communication with the gatekeeper 120 and messages indicated by double-line arrows are transmitted on channels established for communication with the receiving computer.

When a call is initiated from the IP network 110, information about the address of a receiver has already been registered in the gatekeeper 120 according to Q.931. Hence, the home gateway 100 also has the same IP and port information so that the call can be connected to the corresponding terminal according to the received IP and port information and the data of Table 2.

On the other hand, when a call is originated from the local IP network 101, the home gateway 100 has address information according to Q.931 and packet conversion information as shown in Table 2 for use in transmitting a packet to the IP network 110.

Figure 10:
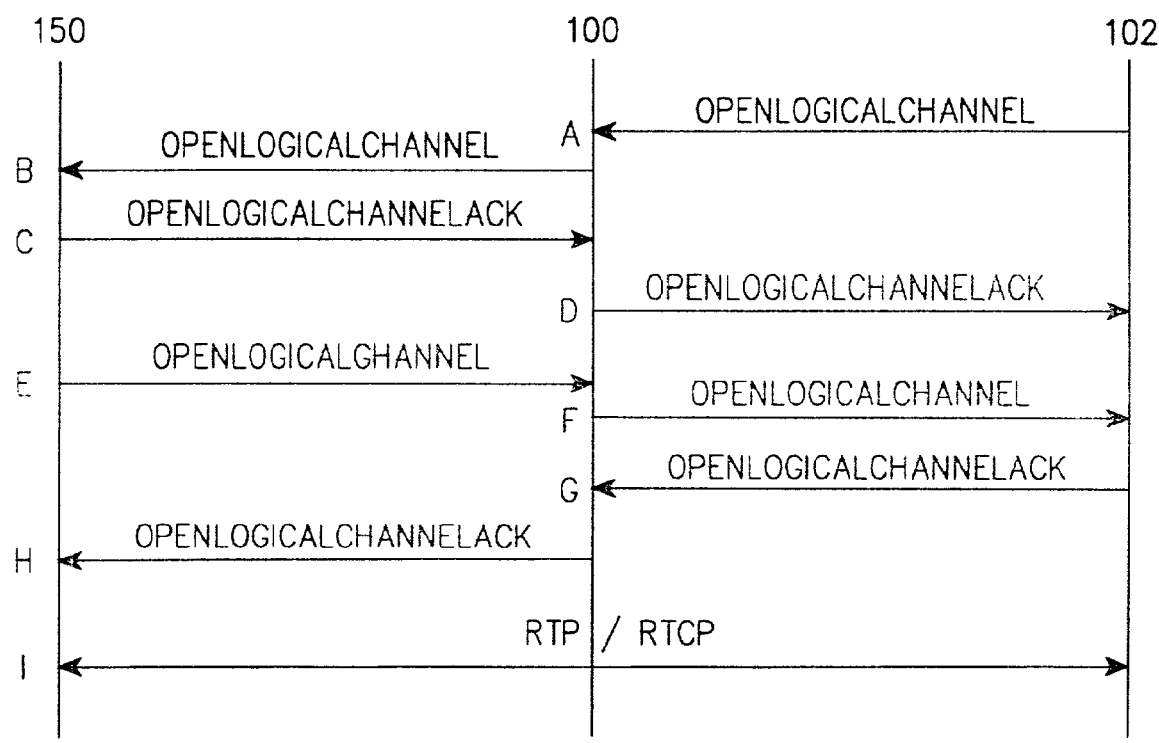
FIG. 10 is a signal flow diagram for protocol conversion in the home gateway.

FIG. 10 is a signal flow diagram for a post-connection procedure. In step A, the computer 102 transmits an RTCP channel message for media transport control and a message OPENLOGICALCHANNEL to the receiving computer 150 via the home gateway 100. Then, the computer 150 transmits an acknowledgment message OPENLOGICALCHANNELACK, including the RTCP channel information of the computer 150, to the computer 102 via the home gateway 100 in steps C and D.

Steps E to H are similar to the above steps except that a call is terminated at a terminal connected to the local IP network from the IP network, which will not be described here.

After RTCP channels are opened in steps A to D or steps E to H, a voice call or a video call is conducted by RTP and RTCP.

The UDP port numbers used differentiate terminals connected to the local IP network 101 like TCP port numbers.

Figure 11:
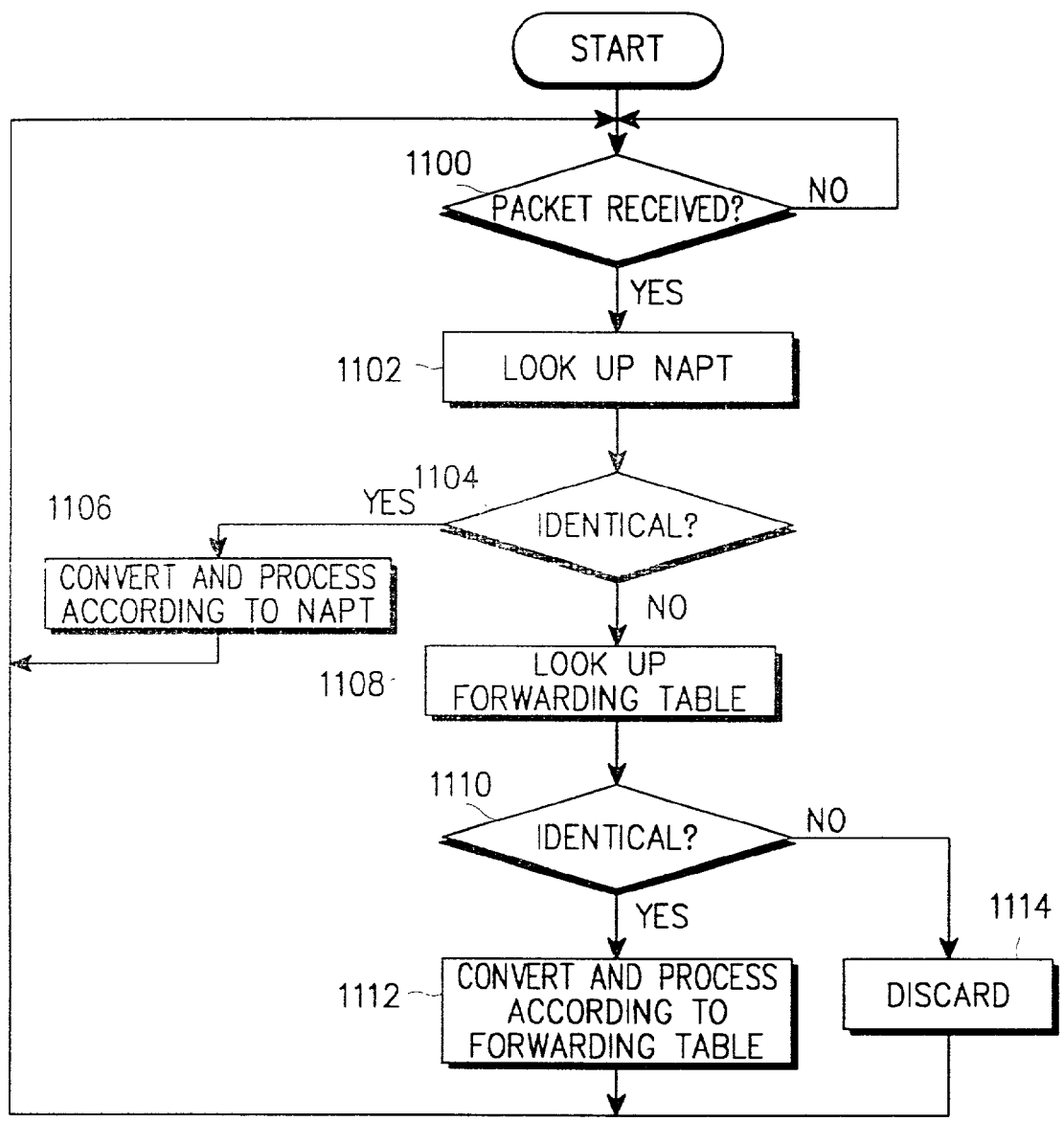
FIG. 11 is a flow chart for processing an incoming call according to the embodiment of the present invention.

FIG. 11 is a flowchart illustrating an operation of processing a call incoming from the IP network 110 in the home gateway 100. Upon receipt of a packet in step 1100, the home gateway 100 determines the type of the received packet by checking the header of the packet. The home gateway 100 looks up an NAPT (Network Address Port Table) in step 1102. The NAPT is made in the same manner as Table 2 and temporarily exists as long as a terminal connected to the local IP network 101 is connected to the Internet. The NAPT includes IP and port information. In general, the port and IP information generated during the Internet connection and the internal IP information are deleted when the connection is released. In the embodiment of the present invention, however, information related to a telephone call is preferably preserved for future call termination. If the received packet turns out to have an IP address and a port number identical to Internet connection information in the NAPT in step 1104, the home gateway 100 converts the IP address in the header of the packet to an internal IP address and transmits the received packet to a corresponding terminal connected to the local IP network 110 in step 1106.

If the IP address and port number of the received packet are not identical to any IP address and port number in the NAPT, the home gateway 100 looks up a forwarding table in step 1108. The forwarding table is made for call initiation and call termination, including assigned IP addresses, internal IP addresses, and port numbers, similarly to Table 2.

If the forwarding table has the detected IP address and port number in step 1110, the home gateway 100 converts the received packet referring to the forwarding table and transmits the converted packet to the terminal in step 1112. If the forwarding table does not have the detected IP address and port number, the home gateway 100 discards the received packet in step 1114.

In summary, the home gateway 100 detects the IP address and port number of a destination by analyzing a received packet. If the detected IP address and port number are present in an Internet connection table, the NAPT, the home gateway 100 converts the received packet referring to the table, considering that the received packet is related to the Internet connection and transmits the converted packet to the destination. If the detected IP address and port number are present in the forwarding table, the home gateway 100 converts the received packet referring to the table, considering that the received packet is related to a telephone call and transmits the converted packet to the destination. If the detected IP address and port number are present neither in the NAPT nor in the forwarding table, the home gateway 100 discards the received packet.

Figure 12:
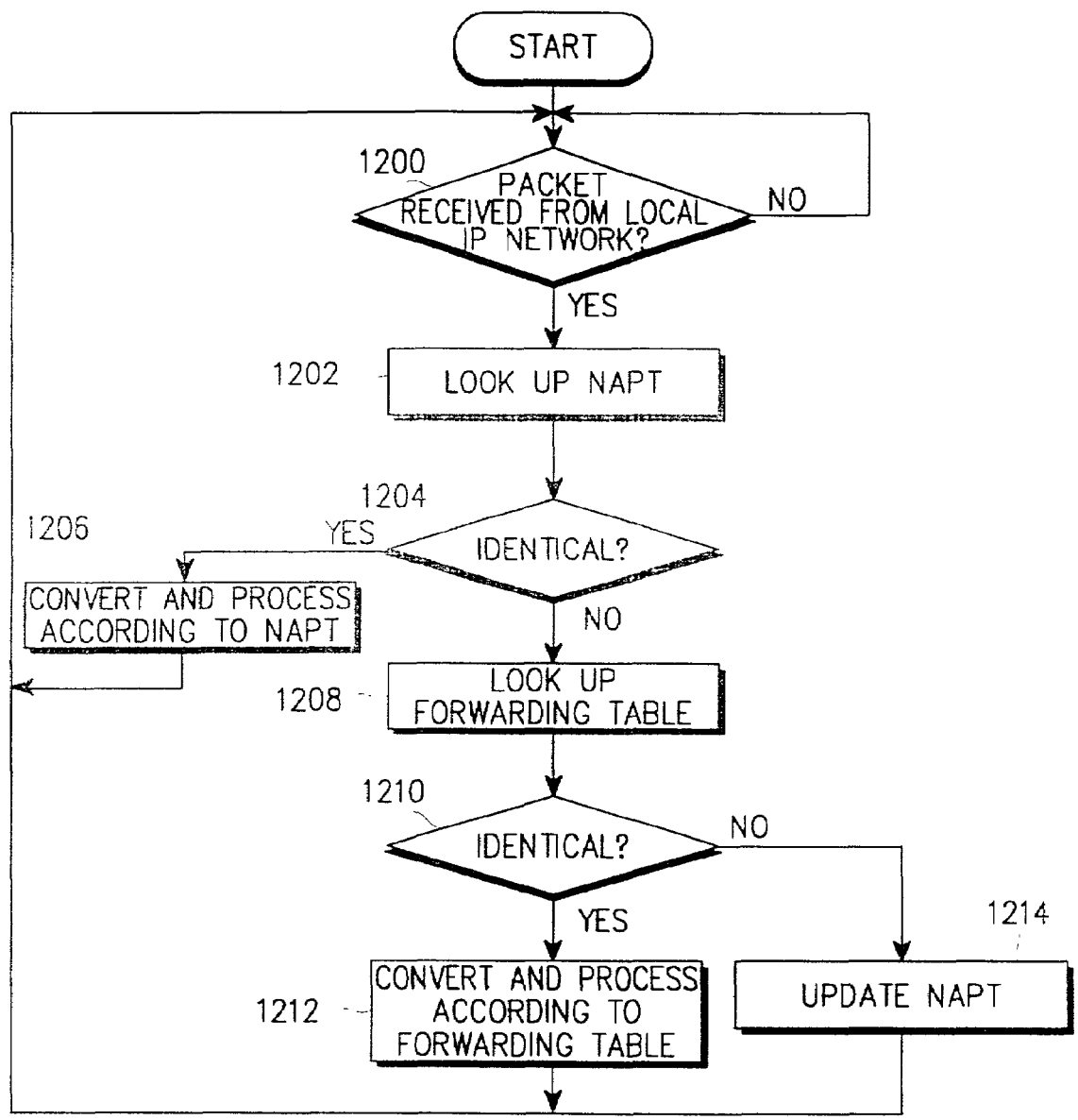
FIG. 12 is a flow chart for processing an outgoing call according to the embodiment of the present invention.

FIG. 12 is a flowchart illustrating an operation of processing an outgoing call of the local IP network 101 in the home gateway 100. Upon receipt of a packet in step 1200, the home gateway 100 determines the type of the received packet by checking the header of the packet. The home gateway 100 looks up the NAPT in step 1202. The NAPT is made in the same manner as Table 2 and temporarily exists as long as a terminal connected to the local IP network 101 is connected to the Internet. The NAPT includes IP and port information. If the received packet has an IP address and a port number that are identical to Internet connection information in the NAPT in step 1204, the home gateway 100 converts the IP address in the header of the packet to an internal IP address and transmits the received packet to the IP network 110 in step 1206.

If the IP address and port number of the received packet are not identical to any IP address and port number in the NAPT, the home gateway 100 looks up a the forwarding table in step 1208. The forwarding table is made for call initiation and call termination, including assigned IP addresses, internal IP addresses, and port numbers, similarly to Table 2.

If the forwarding table has the detected IP address and port number, the home gateway 100 converts the received packet referring to the forwarding table and transmits the converted packet to the terminal in step 1212. If the forwarding table does not have the detected IP address and port number, the home gateway 100 stores information about the packet in the NAPT, converts the header of the packet, and transmits the converted packet to the IP network 110 in step 1214.

In summary, the home gateway 100 detects the IP address and port number of a destination by analyzing a packet received from the local IP network 101. If the detected IP address and port number are present in the NAPT, the home gateway 100 converts the received packet referring to the table, considering that the received packet is related to Internet connection and transmits the converted packet to the IP network 110. If the detected IP address and port number are present in a forwarding table, the home gateway 100 converts the received packet by referring to the table, considering that the received packet is related to a telephone call and transmits the converted packet to the IP network. If the detected IP address and port number are present neither in the NAPT nor in the forwarding table, the home gateway 100 updates the NAPT.

The NAPT and forwarding table may be incorporated into one table and different port numbers may be assigned to Internet connection for a telephone call and conventional Internet connection (e.g., for data search). While the IP and port information generated from the conventional Internet connection can be deleted as the Internet connection is released, information related with a telephone call over the Internet is not deleted but preserved or updated when the telephone call information is changed in the gatekeeper 120.

Telephony using an identical IP address has been described. Since use of the same IP address decreases a transmission rate, the number of terminals that use the same IP address simultaneously may be limited. Considering that real-time transmission is essential to a telephone call, the increase in number of terminals sharing the same IP address may make the real-time transmission impossible. Therefore, it is desirable to limit the number of terminals that can share the same IP address to an optimal value.

In accordance with the present invention as described above, upon receipt of a packet from a terminal connected to a local IP network, a home gateway checks whether the packet is for a telephone call. If the packet is for a telephone call, the home gateway converts the header and payload of the packet according to preset IP and port information and transmits the converted packet to an IP network. If the packet is not for a telephone call, it is determined whether the packet is for conventional Internet communication. If the packet is for the conventional Internet communication, the home gateway converts the packet according to preset IP and port information and transmits the converted packet to the IP network. If the packet is neither for a telephone call nor for the conventional Internet communication, the IP address and port number of the packet are registered for Internet connection. Therefore, a plurality of terminals connected to the local IP network can conduct telephone calls by a single IP address. In this case, terminals connected to the IP network can be interfaced with terminals connected to the local IP network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for multi-telecommunication over a local IP network, comprising:
    an IP network;
    a local IP network;
    a plurality of terminals connected to the local IP network, for conducting a call over the local IP network;
    a home gateway connected to the IP network and the local IP network, for interfacing between the IP network and the plurality of terminals, assigning an ID and a port to each terminal to differentiate terminals sharing one IP address in processing an incoming call and an outgoing call, and converting IP and port information in a header and payload of a received or transmitted packet according to an assigned ID and port number; and
    a gatekeeper connected to the IP network, for performing registration and call connection admission and managing a state of the IP networks,
    wherein respective terminals share the same one IP address and said respective terminals are assigned different port numbers.

2. The system of claim 1, wherein the plurality of terminals connected to the local IP network are for conducting voice or video calls over the local IP network.

3. The system of claim 1, wherein the home gateway includes a memory for storing the IDs and port numbers to process calls incoming and outgoing from and to the local IP network.

4. The system of claim 3, wherein the home gateway operates by converting TCP/UDP, IP, and MAC packets in the header and payload in order to connect to the local IP network.

5. The system of claim 1, wherein the home gateway operates by converting TCP/UDP, IP, and MAC packets in the header and payload in order to connect to the local IP network.

6. The system of claim 1, wherein the home gateway uses a network address port table (NAPT) for an internet connection, and a forwarding table for a call connection.

7. The system of claim 6, wherein the NAPT temporarily exists in accordance with an internet connection.

8. The system of claim 6, wherein the NAPT and the forwarding table include said IP and port information, wherein said IP and port information in said NAPT are deleted if the internet connection is released, and wherein said IP and port information in said forwarding table is preserved.

9. A method of initiating a call for multi-telecommunication over a local IP network, comprising the steps of:
    assigning a port to a first terminal when said first terminal requests a
    call initiation, and storing information of the terminal;
    converting a transmission packet according to the stored information and transmitting the converted transmission packet; and
    converting a received packet when the packet corresponding to the stored information is received, converting the received packet according to the stored information, and transmitting the converted packet to said first terminals,
    wherein said first terminal shares a same IP address with other terminals and said first terminal and said other terminals are assigned different port numbers.

10. The method of claim 9, wherein IP and port information of the terminal is stored in the header and payload of the packet, and changed in the packet conversion.

11. The method of claim 9, further comprising the step of discovering a gatekeeper in an IP network connected to the local IP network and registering said first terminal in the gatekeeper, upon request of the call initiation.

12. The method of claim 11, further comprising the steps of: searching for a gatekeeper using a multicast address by the local IP network upon request of the call initiation;
    registering said first terminal that requests the call initiation in the gatekeeper by an IP address assigned to the local IP network and a port number assigned to said first terminal to differentiate said first terminal from the other terminals sharing the IP address, when the gatekeeper responds; and
    receiving a registration confirmation from the gatekeeper.

13. The method of claim 9, further comprising the steps of:
    searching for a gatekeeper using a multicast address by the local IP network upon request of the call initiation;
    registering said first terminal that requests the call initiation in the gatekeeper according to an IP address assigned to the local IP network and a port number assigned to said first terminal to differentiate said first terminal from the other terminals sharing the IP address, when the gatekeeper responds; and
    receiving a registration confirmation from the gatekeeper.

14. The method of claim 13, further comprising the steps of:
    requesting the call initiation by said first terminal when the registration is completed; and
    admitting call connection according to a state of a second terminal.

15. The method of claim 14, wherein the gatekeeper receives the call initiation request and admits the call connection.

16. The method of claim 15, further comprising the step of requesting call connection by transmitting the IP address and port number of said first terminal to said second terminal when the call connection is admitted.

17. The method of claim 16, further comprising the steps of: requesting a call connection by said second terminal upon receiving the call request; and
transmitting an IP address and a port number of said second terminal to said first terminal when the call connection is admitted.

18. The method of claim 17, wherein the gatekeeper performs the functions of receiving the call connection request and admitting the call connection.

19. The method of claim 18, further comprising the step of establishing channels for real-time transmission between said first terminal and said second terminal by opening channels according to the exchanged IP and port information and exchanging messages.

20. The method of claim 19, further comprising the step of conducting a voice call or a video call on UDP channels when the real-time transmission channels are established.

21. The method of claim 20, wherein the ID of the terminal is an internal IP address assigned by the local IP network.

22. The method of claim 20, wherein a plurality of terminals connected to the local IP network are differentiated by different TCP and UDP ports.

23. The method of claim 22, wherein TCP is a protocol for searching for the gatekeeper, registering the terminals in the gatekeeper, gaining admission to call connection from the gatekeeper for said first terminal, transmitting the IP and port information of said first terminal to said second terminal, gaining admission to call connection from the gatekeeper for said second terminal, transmitting the IP and port information of said second terminal to said first terminal, and establishing the real-time transmission channels.

24. The method of claim 9, wherein transmitted and received packets are converted using an IP address assigned to the local IP network and an internal IP address and port number of said first terminal.

25. The method of claim 24, wherein the local IP network includes a plurality of terminals, including said first terminal, each of said plurality of terminals having respective IP information and port information associated therewith,
wherein said IP information and said port information are used for packet conversion, and
wherein a memory map for storing said IP information and said port information is constructed, said memory map indicating at least one of said plurality of terminals corresponding to a respective IP address, a respective internal IP address for allowing a local network to identify each terminal, and a respective port number.

26. The method of claim 25, wherein said memory map is constructed as a table.

27. The method of claim 25, wherein one of the respective IP addresses is shared by more than one of said plurality of terminals.

28. The method of claim 27, wherein each of the respective internal IP addresses is between the range of 10.0.0.0 to 10.0.255.255.

29. The method of claim 24, wherein in the step of storing information of the terminal, the stored information includes port information, and the port information is registered in a gatekeeper and updated by the gatekeeper when the port information is changed.

30. The method of claim 9, wherein the port is assigned to said first terminal only when said first terminal requests a call initiation.

31. A method of initiating a call for multi-telecommunication over a local IP network, comprising the steps of:
assigning a port to a first terminal when said first terminal requests a call initiation, and storing information of the terminal;
converting a transmission packet according to the stored information and transmitting the converted transmission packet; and
converting a received packet when the packet corresponding to the stored information is received, converting the received packet according to the stored information, and transmitting the converted packet to said first terminal,
wherein transmitted and received packets are converted using an IP address assigned to the local IP network and an internal IP address and port number of said first terminal,
wherein the local IP network includes a plurality of terminals, including said first terminal, each of said plurality of terminals having respective IP information and port information associated therewith,
wherein said IP information and said port information are used for packet conversion,
wherein a memory map for storing said IP information and said port information is constructed, said memory map indicating at least one of said plurality of terminals corresponding to a respective IP address, a respective internal IP address for allowing a local network to identify each terminal, and a respective port number,
wherein one of the respective IP addresses is shared by more than one of said plurality of terminals, and
wherein terminals 1-9 are assigned to IP address 203.234.47.18 and terminals 10 and higher are assigned to IP address 203.234.47.19.

32. A packet receiving method for multi-telecommunication over a local IP network, comprising the steps of:
determining whether a call connection to a second terminal connected to the local IP network is requested by analyzing a packet upon receipt of the packet from an IP network;
opening a channel for said second terminal according to the IP and port information of a destination in the packet upon request of the call connection; and
converting transmitted and received packets according to the IP and port information of a first terminal and said second terminal,
wherein respective terminals share a same IP address and are assigned different port numbers.

33. The method of claim 32, wherein IP and port information in the header and payload of the packet is changed in the packet conversion.

34. The method of claim 32, further comprising the steps of:
requesting admission to call connection upon request of packet receipt, said request sent to a gatekeeper in the IP network connected to the local IP network;
transmitting the IP and port number of said second terminal to said first terminal when the gatekeeper admits the call connection.

35. The method of claim 34, further comprising the step of establishing channels for real-time transmission between said first terminal and said second terminal by opening channels according to the exchanged IP and port information, and exchanging messages.

36. The method of claim 35, further comprising the step of conducting a voice call or a video call on UDP channels when the real-time transmission channels are established.

37. The method of claim 36, wherein a plurality of terminals connected to the local IP network are differentiated by internal IP addresses assigned to the terminals.

38. The method of claim 37, wherein the plurality of terminals connected to the local IP network are differentiated by different TCP and UDP ports assigned to the terminals by the IP network.

39. The method of claim 38, wherein TCP is a protocol for gaining admission to call connection from the gatekeeper, transmitting the IP and port information of said first terminal to said second terminal, and establishing the real-time transmission channels.

40. The method of claim 32, wherein transmitted and received packets are converted using the IP address assigned to the local IP network and the internal IP address and port number of the terminal connected to the local IP network.

41. The method of claim 40, wherein the local IP network includes a plurality of terminals, including said first terminal and said second terminal, each of said plurality of terminals having respective IP information and port information associated therewith,
  wherein said IP information and said port information are used for packet conversion, and
  wherein a memory map for storing said IP information and said port information is constructed, said memory map indicating at least one of said plurality of terminals corresponding to a respective IP address, a respective internal IP address for allowing a local network to identify each terminal, and a respective port number.

42. The method of claim 41, wherein said memory map is constructed as a table.

43. The method of claim 41, wherein one of the respective IP addresses is shared by more than one of said plurality of terminals.

44. The method of claim 43, wherein each of the respective internal IP addresses is between the range of 10.0.0.0 to 10.0.255.255.

45. The method of claim 41, wherein the port information is registered in a gatekeeper and updated by the gatekeeper when the port information is changed.

46. A packet receiving method for multi-telecommunication over a local IP network, comprising the steps of:
  determining whether a call connection to a second terminal connected to the local IP network is requested by analyzing a packet Upon receipt of the packet from an IP network;
  opening a channel for said second terminal according to the IP and port information of a destination in the packet upon request of the call connection; and
  converting transmitted and received packets according to the IP and port information of a first terminal and said second terminal,
  wherein transmitted and received packets are converted using the IP address assigned to the local IP network and the internal IP address and port number of the terminal connected to the local IP network,
  wherein the local IP network includes a plurality of terminals, including said first terminal and said second terminal, each of said plurality of terminals having respective IP information and port information associated therewith,
  wherein said IP information and said port information are used for packet conversion,
  wherein a memory map for storing said IP information and said port information is constructed, said memory map indicating at least one of said plurality of terminals corresponding to a respective IP address, a respective internal IP address for allowing a local network to identify each terminal, and a respective port number,
  wherein one of the respective IP addresses is shared by more than one of said plurality of terminals, and
  wherein terminals 1-9 are assigned to IP address 203.234.47.18 and terminals 10 and greater are assigned to IP address 203.234.47.19.

47. A method of conducting a telephone call using one IP address for a plurality of terminals connected to a local IP network, comprising the steps of:
  determining whether a packet is assigned to the local IP network by a home gateway of the local IP network, upon receipt of the packet from an IP network;
  determining whether the packet is for a telephone call if the packet is assigned to the local IP network;
  converting the header and payload of the packet according to IP and port information preset for the telephone call, if the packet is for the telephone call, and transmitting the converted packet to a terminal connected to the local IP network;
  determining whether the packet is for Internet communication if the packet is not for the telephone call; and
  converting the packet according to IP and port information preset for the Internet communication if the packet is for the Internet communication and transmitting the converted packet to the terminal connected to the local IP network,
  wherein respective terminals share the same one IP address and said respective terminals are assigned different port numbers.

48. The method of claim 47, wherein the port information indicate a port assigned for the Internet communication and a port assigned to the terminal for the telephone call in order to differentiate the terminal from the other terminals sharing the same IP address.

49. The method of claim 48, wherein the ports are TCP and UDP ports.

50. The method of claim 47, wherein the ports are TCP and UDP ports.

51. A method of conducting a telephone call using one IP address for a plurality of terminals connected to a local IP network, comprising the steps of:
  determining whether a packet is for a telephone call by a home gateway of the local IP network upon receipt of the packet from a terminal connected to the local IP network;
  converting the header and payload of the packet, if the packet is for the telephone call, and transmitting the converted packet to an IP network;
  determining whether the packet is for a first Internet communication if the packet is not for the telephone call;
  converting the packet and transmitting the converted packet to the IP network; and
  registering an IP address and a port number of the packet for a second Internet communication if the packet is neither for the telephone call nor for the first Internet communication,
  wherein respective terminals share the same one IP address and said respective terminals are assigned different port numbers.

52. The method of claim 51, wherein if the packet is for the telephone call, the header and payload of the packet are converted according to IP and port information preset for the telephone call, and if the packet is for the first Internet communication, the packet is converted according to IP and port information preset for the first Internet communication.

53. The method of claim 52, wherein the port information indicate a port assigned for the conventional Internet communication and a port assigned to the terminal for the telephone call to identify the terminal from the other terminals sharing the same IP address.

54. The method of claim 53, wherein the ports are TCP and UDP port.

55. The method of claim 52, wherein the ports are TCP and UDP ports.

* * * * *